United States Patent
Pajukoski et al.

(10) Patent No.: US 10,015,817 B2
(45) Date of Patent: Jul. 3, 2018

(54) METHOD AND APPARATUS FOR CONFIGURING SCHEDULING PERIODS BASED ON INFORMATION ABOUT THE MODE OF OPERATION

(71) Applicant: NOKIA SOLUTIONS AND NETWORKS OY, Espoo (FI)

(72) Inventors: Kari Pekka Pajukoski, Oulu (FI); Esa Tapani Tiirola, Kempele (FI); Jaakko Eino Ilmari Vihriala, Oulu (FI); Eeva Lahetkangas, Oulu (FI); Ilkka Harjula, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 35 days.

(21) Appl. No.: 14/894,888

(22) PCT Filed: May 31, 2013

(86) PCT No.: PCT/EP2013/061218
§ 371 (c)(1),
(2) Date: Nov. 30, 2015

(87) PCT Pub. No.: WO2014/191045
PCT Pub. Date: Dec. 4, 2014

(65) Prior Publication Data
US 2016/0128097 A1    May 5, 2016

(51) Int. Cl.
H04W 72/12    (2009.01)
H04W 72/14    (2009.01)
(Continued)

(52) U.S. Cl.
CPC .......... *H04W 72/14* (2013.01); *H04L 5/0055* (2013.01); *H04L 47/72* (2013.01);
(Continued)

(58) Field of Classification Search
None
See application file for complete search history.

(56) References Cited

U.S. PATENT DOCUMENTS

2010/0091919 A1*    4/2010    Xu ................. H04L 1/0025
                                                        375/346
2010/0304682 A1    12/2010    Choi et al.
(Continued)

FOREIGN PATENT DOCUMENTS

EP           2451233 A1       5/2012
KR    10-2010-0035088 A       4/2010
(Continued)

OTHER PUBLICATIONS

Korea Office Action for Korean Patent Application 10-2015-7037007, dated Jun. 15, 2016, 11 pages.
(Continued)

*Primary Examiner* — Chi H Pham
*Assistant Examiner* — Shick Hom
(74) *Attorney, Agent, or Firm* — Brake Hughes Bellermann LLP

(57) ABSTRACT

According to an example implementation, a method includes: receiving, at an apparatus, information from a node, the information defining a mode of operation for communicating scheduling information; and configuring transmission and reception periods of scheduling information at the apparatus in dependence on the mode of operation.

23 Claims, 10 Drawing Sheets

(51) Int. Cl.
  *H04L 12/911* (2013.01)
  *H04L 5/00* (2006.01)
  *H04W 84/04* (2009.01)
  *H04W 92/20* (2009.01)
  *H04L 1/18* (2006.01)

(52) U.S. Cl.
  CPC ....... *H04W 72/1278* (2013.01); *H04L 1/1854* (2013.01); *H04W 84/045* (2013.01); *H04W 84/047* (2013.01); *H04W 92/20* (2013.01)

(56) References Cited

U.S. PATENT DOCUMENTS

| | | | |
|---|---|---|---|
| 2011/0038311 A1 | 2/2011 | Marin et al. | |
| 2011/0176477 A1 | 7/2011 | Lee et al. | |
| 2012/0281683 A1 | 11/2012 | Falconetti et al. | |
| 2013/0021929 A1 | 1/2013 | Kim et al. | |
| 2013/0028126 A1* | 1/2013 | Kazmi | H04W 36/0088 370/252 |
| 2013/0343440 A1* | 12/2013 | Negus | H04B 1/38 375/219 |

FOREIGN PATENT DOCUMENTS

| | | |
|---|---|---|
| KR | 10-2013-0008468 A | 1/2013 |
| KR | 10-2013-0036383 A | 4/2013 |
| WO | 2008088243 A1 | 7/2008 |
| WO | 2013/051824 A1 | 4/2013 |

OTHER PUBLICATIONS

Final Office Action with English translation for Korean Application 10-2015-7037007, dated Dec. 23, 2016, 14 pages.

International Search Report and Written Opinion for International Application No. PCT/EP2013/061218, dated Jan. 20, 2014, 12 pages.

Emmanouil Pateromichelakis, et al.; "On the Evolution of Mulit-Cell Scheduling in 3GPP LTE / LTE-A"; IEEE Communications Surveys & Tutorials, vol. 15, No. 2, Second Quarter 2013; pp. 701-717.

First Office Action for Chinese Application No. 201380078088.2, dated Mar. 19, 2018, 14 pages.

* cited by examiner

METHOD AND APPARATUS FOR CONFIGURING SCHEDULING PERIODS BASED ON INFORMATION ABOUT THE MODE OF OPERATION

This application is a national stage entry of PCT Application No. PCT/EP2013/061218, filed May 31, 2013, entitled "METHOD AND APPARATUS FOR CONFIGURING SCHEDULING PERIODS BASED ON INFORMATION ABOUT THE MODE OPERATION" which is hereby incorporated by reference in its entirety.

Embodiments of the present invention relate to scheduling information.

Communication of control information and data can be provided between two or more devices such as fixed or mobile communication devices, base stations, servers, machine type devices, and/or other communication nodes. A communication system and compatible communicating devices typically operate in accordance with a given standard and/or specification setting out how various entities of the system shall operate. Communications may take be provided on fixed or wireless connections. In a wireless system at least a part of the communication between at least two devices, or stations or access points (APs) occurs over a wireless interface. Examples of wireless systems include public land mobile networks (PLMN) such as cellular networks, satellite based communication systems and different wireless local networks, for example wireless local area networks (WLAN) and/or WiMax (Worldwide Interoperability for Microwave Access). A more particular example of wireless communication systems is an architecture standardized by the 3rd Generation Partnership Project (3GPP). This system is often referred to as the long-term evolution (LTE) of the Universal Mobile Telecommunications System (UMTS) radio-access technology. A further development of the LTE is often referred to as LTE-Advanced. Further developments are being contemplated, such as Beyond 4G (B4G) or 5G.

In a wireless system a communication device can provide a transceiver station that can communicate with another communication device such as e.g. base stations or access points of access networks and/or other user equipment. A communication device of a user is often referred to as user equipment (UE) or terminal. A communication device is provided with an appropriate signal receiving and transmitting arrangement for enabling communication of data and signalling with other parties. For example, access to a communication network or communications directly with other users can be provided. The communication device may access a wider communication system via an access point such as a base station, for example a base station providing at least one cell.

Local area systems can be deployed either in a standalone or a centrally coordinated manner. In a standalone local area system all access points in the network may operate independently with respect to each other. In a centralized (or coordinated) local area operation access points are coordinated by a wireless centralized controller. In a centralized wireless local area network (WLAN), an access controller communicates with the access points to provide scalable centralized control across the wireless network. This functionality may be physically located in one of the existing access points.

In order to support future traffic demand, there is a need to provide dense deployment of access points with a high capacity backhaul. A wired backhaul, e.g., fibre, may not be a practical or economical approach in all deployment scenarios. In these cases wireless backhaul may be required to connect access points over the air to one or more aggregation nodes. Furthermore, multi-hop relaying between UEs/APs may be required in order to provide improved coverage for the highest bitrates.

Accordingly in a first aspect there is provided a method comprising: receiving, at an apparatus, information from a node, said information defining a mode of operation for communicating scheduling information; and configuring transmission and reception periods of scheduling information at said apparatus in dependence on the mode of operation.

Said mode of operation may comprise at least one of a stand-alone mode and a co-ordinated mode.

When operating in said co-ordinated mode, said method may comprise configuring said apparatus to co-ordinate transmission and reception periods with a second apparatus.

When operating in said stand-alone mode, said method may comprise configuring transmission and reception intervals of said apparatus independently of said second apparatus.

When operating in said co-ordinated mode, said method may comprise configuring said apparatus to communicate scheduling information with said node in coordination with said second apparatus.

The method may comprise configuring said apparatus to communicate scheduling information with said node during a time period in which said second apparatus is not communicating scheduling information with said node.

The method may comprise configuring said apparatus not to communicate scheduling information with said node during a time period in which said second apparatus is communicating scheduling information with said node.

The method may comprise coordinating scheduling information such that said apparatus is configured to transmit scheduling information during a time period when said second apparatus is receiving scheduling information, and to receive scheduling information during a time period when said second apparatus is transmitting scheduling information.

Said time period may comprise at least one frame or at least one subframe.

Said method may comprise establishing a control connection between said apparatus and at least one of said second apparatus and said node.

Said scheduling information may comprise at least one of a scheduling grant and a scheduling request.

Said mode of operation may define at least one parameter relating to said scheduling information, wherein said at least one parameter comprises at least one of: transmission time interval; scheduling timing; and hybrid automatic repeat request acknowledgement/non-acknowledgement timing.

The method may comprise switching said apparatus between said stand-alone mode and said coordinated mode.

Said apparatus may comprise one of user equipment and a relay node, and said second apparatus comprises one of user equipment and a relay node.

Said node may comprise a master access point.

In a second aspect there is provided a computer program comprising computer executable instructions which when run on one or more processors perform the method of the first aspect.

In a third aspect there is provided an apparatus comprising at least one processor; and at least one memory including computer program code; the at least one memory and the computer program code configured to, with the at least one processor, cause the apparatus at least to: receive information from a node, said information defining a mode of operation for communicating scheduling information; and configure transmission and reception periods of scheduling information in dependence on the mode of operation.

Said mode of operation may comprise at least one of a stand-alone mode and a co-ordinated mode.

When operating in said co-ordinated mode, said apparatus may be configured to co-ordinate transmission and reception periods with a second apparatus.

When operating in said stand-alone mode, said apparatus may be configured to configure transmission and reception intervals independently of said second apparatus.

When operating in said co-ordinated mode, said apparatus may be configured to communicate scheduling information with said node in coordination with said second apparatus.

Said apparatus may be configured to communicate scheduling information with said node during a time period in which said second apparatus is not communicating scheduling information with said node.

Said apparatus may be configured not to communicate scheduling information with said node during a time period in which said second apparatus is communicating scheduling information with said node.

The apparatus may be configured to coordinate scheduling information such that said apparatus is configured to transmit scheduling information during a time period when said second apparatus is receiving scheduling information, and to receive scheduling information during a time period when said second apparatus is transmitting scheduling information.

Said time period may comprise at least one frame or at least one subframe.

Said apparatus may be configured to establish a control connection with at least one of said second apparatus and said node.

Said scheduling information may comprise at least one of a scheduling grant and a scheduling request.

Said mode of operation may define at least one parameter relating to said scheduling information, and wherein said at least one parameter comprises at least one of: transmission time interval; scheduling timing; and hybrid automatic repeat request acknowledgement/non-acknowledgement timing.

Said apparatus may be configured to switch between said stand-alone mode and said coordinated mode.

Said apparatus may comprise one of user equipment and a relay node.

In a fourth aspect there is provided a method comprising: controlling a transmission, to at least one apparatus, of information from a node, said information defining a mode of operation for communicating scheduling information; wherein said information transmitted from said node is configured to cause said at least one apparatus to configure transmission and reception periods of scheduling information in dependence on the mode of operation.

Said mode of operation may comprise one of a stand-alone mode and a co-ordinated mode.

Said method may comprise controlling transmission of said information to a first apparatus and a second apparatus.

When said information comprises information defining a co-ordinated mode, said method may further comprise configuring said node to communicate scheduling information with said first apparatus and said second apparatus in a co-ordinated manner.

Said method may comprise configuring said node to communicate scheduling information with said first apparatus during a time period in which said node is not communicating scheduling information with said second apparatus.

Said method may comprise configuring said node not to communicate scheduling information with said first apparatus during a time period in which said node is communicating scheduling information with said second apparatus.

Said method may comprise coordinating scheduling information such that said node is configured to transmit scheduling information to said first apparatus during a time period when said node is receiving scheduling information from said second apparatus, and to receive scheduling information from said first apparatus during a time period when said node is transmitting scheduling information to said second apparatus.

Said time period may comprise at least one frame or at least one subframe.

Said scheduling information may comprise at least one of a scheduling grant and a scheduling request.

Said mode of operation may define at least one parameter relating to said scheduling information, wherein said at least one parameter comprises at least one of: transmission time interval; scheduling timing; and hybrid automatic repeat request acknowledgement/non-acknowledgement timing.

Said method may comprise controlling transmission of an instruction to said at least one apparatus to switch said mode of operation.

Said node may comprise a master access point.

In a fifth aspect there is provided a computer program comprising computer executable instructions which when run on one or more processors perform the method of the fourth aspect.

In a sixth aspect there is provided an apparatus comprising at least one processor; and at least one memory including computer program code; the at least one memory and the computer program code configured to, with the at least one processor, cause the apparatus at least to: control a transmission, to at least one further apparatus, of information, said information defining a mode of operation for communicating scheduling information; wherein said information is configured to cause said at least one further apparatus to configure transmission and reception periods of scheduling information in dependence on the mode of operation.

Said mode of operation may comprise one of a stand-alone mode and a co-ordinated mode.

Said apparatus may be configured to control transmission of said information to at least one further apparatus comprising a second apparatus and a third apparatus.

When said information comprises information defining a co-ordinated mode, said apparatus may be configured to communicate scheduling information with said second apparatus and said third apparatus in a co-ordinated manner.

Said apparatus may be configured to communicate scheduling information with said second apparatus during a time period in which said apparatus is not communicating scheduling information with said third apparatus.

Said apparatus may be configured not to communicate scheduling information with said second apparatus during a time period in which said apparatus is communicating scheduling information with said third apparatus.

Said apparatus may be configured to transmit scheduling information to said second apparatus during a time period when said apparatus is receiving scheduling information from said third apparatus, and to receive scheduling information from said second apparatus during a time period when said apparatus is transmitting scheduling information to said third apparatus.

Said time period may comprise at least one frame or at least one subframe.

Said scheduling information may comprise at least one of a scheduling grant and a scheduling request.

Said mode of operation may define at least one parameter relating to said scheduling information, wherein said at least one parameter comprises at least one of: transmission time interval; scheduling timing; and hybrid automatic repeat request acknowledgement/non-acknowledgement timing.

Said apparatus may be configured to control transmission of an instruction to said at least one further apparatus to switch said mode of operation.

Said apparatus may comprise a master access point.

In a seventh aspect there is provided an apparatus comprising: means for receiving information from a node, said information defining a mode of operation for communicating scheduling information; and means for configuring transmission and reception periods of scheduling information in dependence on the mode of operation.

Said mode of operation may comprise at least one of a stand-alone mode and a co-ordinated mode.

When operating in said co-ordinated mode said apparatus may be configured to co-ordinate transmission and reception periods with a second apparatus.

When operating in said stand-alone mode, said apparatus may be configured to configure transmission and reception intervals independently of said second apparatus.

When operating in said co-ordinated mode, said apparatus may be configured to communicate scheduling information with said node in coordination with said second apparatus.

Said apparatus may be configured to communicate scheduling information with said node during a time period in which said second apparatus is not communicating scheduling information with said node.

Said apparatus may be configured not to communicate scheduling information with said node during a time period in which said second apparatus is communicating scheduling information with said node.

Said apparatus may be configured to coordinate scheduling information such that said apparatus is configured to transmit scheduling information during a time period when said second apparatus is receiving scheduling information, and to receive scheduling information during a time period when said second apparatus is transmitting scheduling information.

Said time period may comprise at least one frame or at least one subframe.

Said apparatus may comprise means for establishing a control connection with at least one of said second apparatus and said node.

Said scheduling information may comprise at least one of a scheduling grant and a scheduling request.

Said mode of operation may define at least one parameter relating to said scheduling information wherein said at least one parameter comprises at least one of: transmission time interval; scheduling timing; and hybrid automatic repeat request acknowledgement/non-acknowledgement timing.

Said apparatus may comprise means for switching between said stand-alone mode and said coordinated mode.

Said apparatus may comprise one of user equipment and a relay node.

In an eighth aspect there is provided an apparatus comprising means for controlling a transmission, to at least one further apparatus, of information, said information defining a mode of operation for communicating scheduling information; wherein said information is configured to cause said at least one further apparatus to configure transmission and reception periods of scheduling information in dependence on the mode of operation.

Said mode of operation may comprise one of a stand-alone mode and a co-ordinated mode.

Said apparatus may comprise means for controlling transmission of said information to at least one further apparatus comprising a second apparatus and a third apparatus.

When said information comprises information defining a co-ordinated mode, said apparatus may communicate scheduling information with said second apparatus and said third apparatus in a co-ordinated manner.

Said apparatus may be configured to communicate scheduling information with said second apparatus during a time period in which said apparatus is not communicating scheduling information with said third apparatus.

Said apparatus may be configured not to communicate scheduling information with said second apparatus during a time period in which said apparatus is communicating scheduling information with said third apparatus.

Said apparatus may be configured to transmit scheduling information to said second apparatus during a time period when said apparatus is receiving scheduling information from said third apparatus, and to receive scheduling information from said second apparatus during a time period when said apparatus is transmitting scheduling information to said third apparatus.

Said time period may comprise at least one frame or at least one subframe.

Said scheduling information may comprise at least one of a scheduling grant and a scheduling request.

Said mode of operation may define at least one parameter relating to said scheduling information, wherein said at least one parameter comprises at least one of: transmission time interval; scheduling timing; and hybrid automatic repeat request acknowledgement/non-acknowledgement timing.

Said apparatus may control transmission of an instruction to said at least one further apparatus to switch said mode of operation.

Said apparatus may comprise a master access point.

Embodiments of the invention will now be described, by way of example only, with reference to the accompanying drawings in which.

Figure 1:
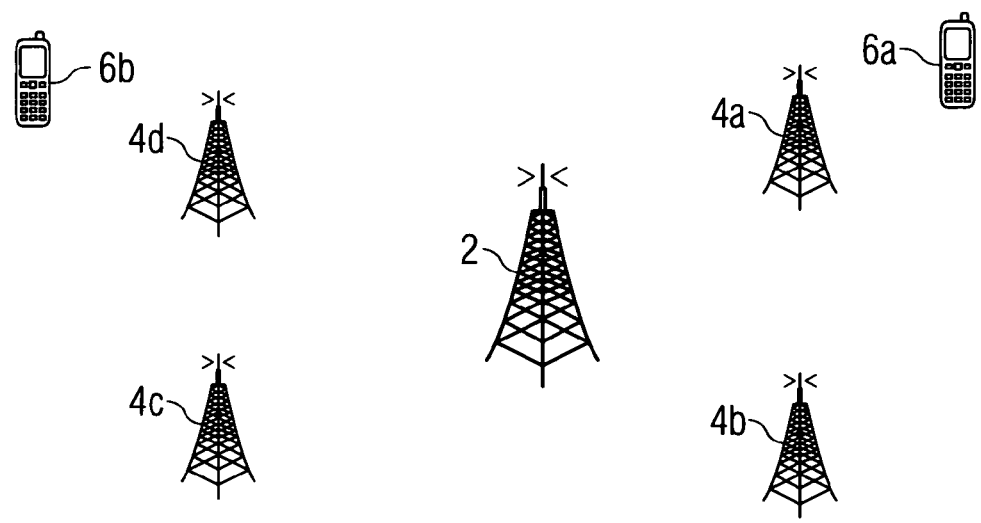
FIG. 1 illustrates an example of a collection of neighbouring nodes for which embodiments of the present invention can be implemented.

FIG. 1 illustrates an example of a collection of nodes in which an embodiment of the present invention can be implemented. The collection of nodes includes an access point AP 2, relay nodes 4 under the control of access point 2, and user devices 6, such as user equipment (UE). For simplicity, only 2 UEs are shown in FIG. 1, but a large number of UEs would typically be within the control area of an AP at any one time.

The access point 2 may for example be a base station (e.g. eNodeB of a Evolved UTRAN) of a radio access network, typically comprising thousands of such base stations each operating one or more cells. The coverage area of each cell depends on the transmission power and the directionality of the antenna by which the cell is operated. Alternatively, the access point may be a combination of network entities such as a remote radio head and server or host. The relay nodes 4 mainly facilitate connections between the UEs 6 and the AP 2, but can also facilitate connections between UEs 6 other than via the AP 2. Connections between two UEs 2 via a relay node 4 may also be operated under the control of the access point 2.

The AP 2, RNs 4 and UEs 6 each typically regularly broadcast signals from which can be obtained information about the radio links between each pair of nodes. The RNs 4 and UEs 6 report measurements of these signals to the controlling AP 2.

In some deployments the AP 2 may be referred to as a "master" access point or node, and the RNs 4 may be referred to as "slave" access points or nodes, in as much as they operate under the control of the "master" node. Hereon the term "relay" or "relay node" is used interchangeably with the term "slave node" or "slave access point".

In a typical scenario the AP 2, RNs 4 and UEs 6 operate on the same frequency band. However, it is also possible that there are multiple frequency bands in use, e.g. such that APs use one frequency band (F1) and RNs use another frequency band (F2). In this scenario, the UE may need to support both frequency bands.

In another typical scenario time division duplex (TDD) is applied wherein transmission and reception takes place on the same frequency band. In this scenario, different nodes may need to support half-duplex operation where transmission and reception is not supported at the same time. However, other possible scenarios include frequency division duplex (FDD) where the transmission and reception takes place on different frequency bands as well as full-duplex transmission/reception on a single frequency band.

Figure 2A:
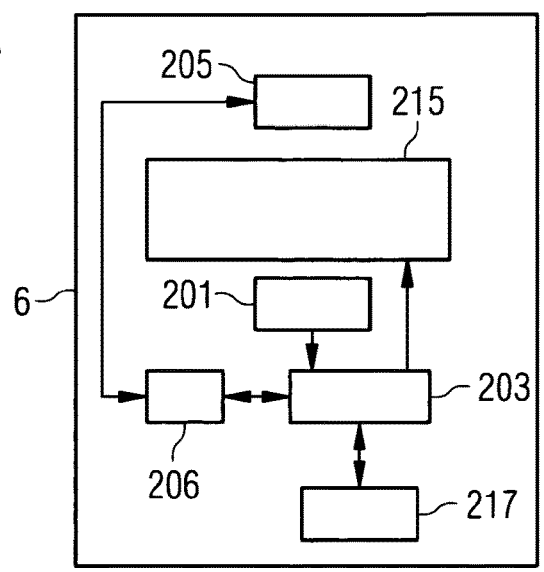
FIG. 2a illustrates an example of apparatus for use at a user equipment (UE) in FIG. 1.

FIG. 2a shows a schematic view of an example of user equipment or user device (UE) 6 that may be used for communicating with the RNs 4 or AP 2 of FIG. 1 via a wireless interface. The UE 6 may be any device capable of at least sending or receiving radio signals to or from the AP 2 or RNs 4 of FIG. 1.

The user device, or user equipment, typically refers to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, e-reader device and multimedia device provided with a wireless interface facility. It should be appreciated that a user device may also be a nearly exclusive uplink only device, of which an example is a camera or video camera loading images or video clips to a network.

The UE 6 may communicate via radio transceiver circuitry, unit or module 206 and associated antenna arrangement 205 comprising at least one antenna or antenna unit. The antenna arrangement 205 may be arranged internally or externally to the UE 2.

The UE 6 may be provided with at least one data processing entity 203 and at least one memory or data storage entity 217 for use in tasks it is designed to perform. The data processor 203 and memory 217 may be provided on an appropriate circuit board and/or in chipsets. The memory or data storage entity is typically internal but may also be external or a combination thereof, such as in the case when additional memory capacity is obtained from a service provider.

In the cases of devices designed for human interaction, the user may control the operation of the UE 6 by means of a suitable user interface such as key pad 201, voice commands, touch sensitive screen or pad, combinations thereof or the like. A display 215, a speaker and a microphone may also be provided. Furthermore, the UE 6 may comprise appropriate connectors (either wired or wireless) to other devices and/or for connecting external accessories, for example hands-free equipment, thereto.

Figure 2B:
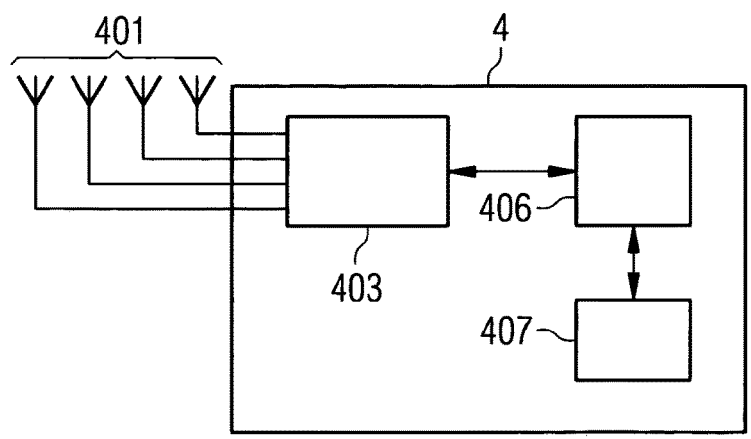
FIG. 2b illustrates an example of apparatus for use at a relay node (RN) in FIG. 1.

FIG. 2b shows an example of apparatus for use at the RNs of FIG. 1. The apparatus comprises or is coupled to a radio frequency antenna array 401 (comprising at least one antenna or antenna unit) configured to receive and/or transmit radio frequency signals; radio transceiver circuitry, module or unit 403 configured to interface the radio frequency signals received and transmitted by the antenna 401 and the data processor 406. The data processor 406 is configured to process signals from the radio transceiver 403. It may also control the radio transceiver 403 to generate suitable RF signals to communicate information to another of the nodes (UE or AP) via the wireless communications link. The memory or data storage unit 407 is used for storing data, parameters and/or instructions for use by the data processor 406. The memory or data storage entity may be internal or external (locating in another network entity) or a combination thereof.

Figure 3:
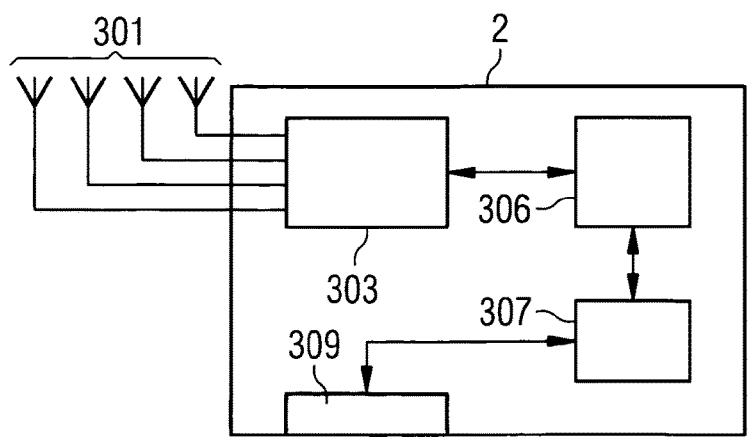
FIG. 3 illustrates an example of apparatus for use at an access point in FIG. 1.

FIG. 3 shows an example of apparatus for use at the AP 2 of FIG. 1. The apparatus comprises or is coupled to a radio frequency antenna array 301 (comprising at least one antenna or antenna unit) configured to receive and/or transmit radio frequency signals; radio transceiver circuitry, module or unit 303 configured to interface the radio frequency signals received and transmitted by the antenna 301 and the data processor 306. The apparatus usually comprises an interface 309 via which, for example, it can communicate with other network elements such as the core network (not shown). The data processor 306 is configured to process signals from the radio transceiver 303. It may also control the radio transceiver 303 to generate suitable RF signals to communicate information to another of the nodes (UE or RN) via the wireless communications link, and also to exchange information with other network nodes across a wired link via the interface 309. The memory or data storage unit 307 is used for storing data, parameters and/or instructions for use by the data processor 306. The memory or data storage entity may be internal or external (locating in another network entity) or a combination thereof.

The memories 217, 307, 407 may be implemented using an suitable data storage technology, such as, for example, semiconductor based memory devices, flash memory, magnetic memory devices and systems, optical memory devices and systems, fixed memory and removable memory. The processors 203, 306, 406 may, for example, include one or more of microprocessors, digital signal processors (DSPs) and processors based on a multi-core processor architecture.

References below to data processors 203, 306, 406 controlling the operation of the UE and NB refer to the data processors operating in accordance with program code stored at memories 217, 307, 407.

It would be appreciated that the apparatus shown in each of FIGS. 2 and 3 described above may comprise further elements which are not directly involved with the embodiments of the invention described hereafter.

It should be understood that communication systems and apparatuses may be integrated towards an infrastructure (more and more) based on undedicated and programmable hardware providing needed functionalities. A network element, such as a node may be a computing equivalent device that gathers programmable resources based on virtualisation technologies.

FIG. 1, for the purposes of explanation, shows a limited number of APs, RNs and UEs. As noted by the inventors of the present application, in open areas such as conference halls centrally coordinated system architectures can provide substantial gains, especially when APs are densely populated. However, the gain may significantly decline in scenarios with marginal increase in wall penetration loss between APs. Considering the economic scale and large use cases of AP products, the present inventors have identified that it may be desirable for APs to be operable in both stand-alone and coordinated modes. The present inventors have also identified that it is therefore desirable to provide a flexible air interface.

This may be applicable to both LTE and Beyond 4G (B4G) (or 5G) systems.

It is envisaged that the B4G system will be optimized for Time Division Duplex (TDD), with half-duplex operation, so as to minimise UE and AP costs. This means not only that the UE and AP cannot transmit and receive at the same time, but also that there may be a limited capacity to communicate towards different types of network elements.

WiFi systems can be deployed in both stand-alone and centrally coordinated manners. However, there are differences between the WiFi scenario and a B4G scenario. One difference is that WiFi is based on carrier sense multiple access with collision avoidance (CSMA/CA), whereas B4G will most likely be based on scheduled frame base access (similar to LTE).

LTE systems support in-band relaying wherein the backhaul link of Donor eNB to Relay Node (DeNB-RN) uses the same radio resources as the access link (RN-UE). Type 1 relays are the default: they have their own cell ID, and transmit their own synchronization channels. The UE (connected to a RN) receives scheduling information, HARQ feedback and control channels from the RN.

In LTE-A, if a UE is connected to a relay, the eNB cannot control the scheduling, HARQ and SR/CQI/ACK for the UE. There is also no inherent support for control signaling supporting coordinated and standalone modes.

WiMAX also supports in-band relaying with IEEE 802.16j and 802.16m standards. In 802.16j relay station (RS) can be seen to form a master-slave arrangement with the IEEE 802.16 base station (BS). Either only RS or both RS and UE receive control information from the BS. In the IEEE 802.16m system, the relay stations compose and transmit the synchronization channels, system information, and the control channels for the subordinate stations.

In Wi-Max the relay operation requires a special zone in PHY layer. It may not be possible to use standard WiMAX PHY frames for the communication between RS and BS. Also, the WiMAX PHY layer relaying concept is not flexible, thus it does not allow use of different operation modes.

Figure 4:
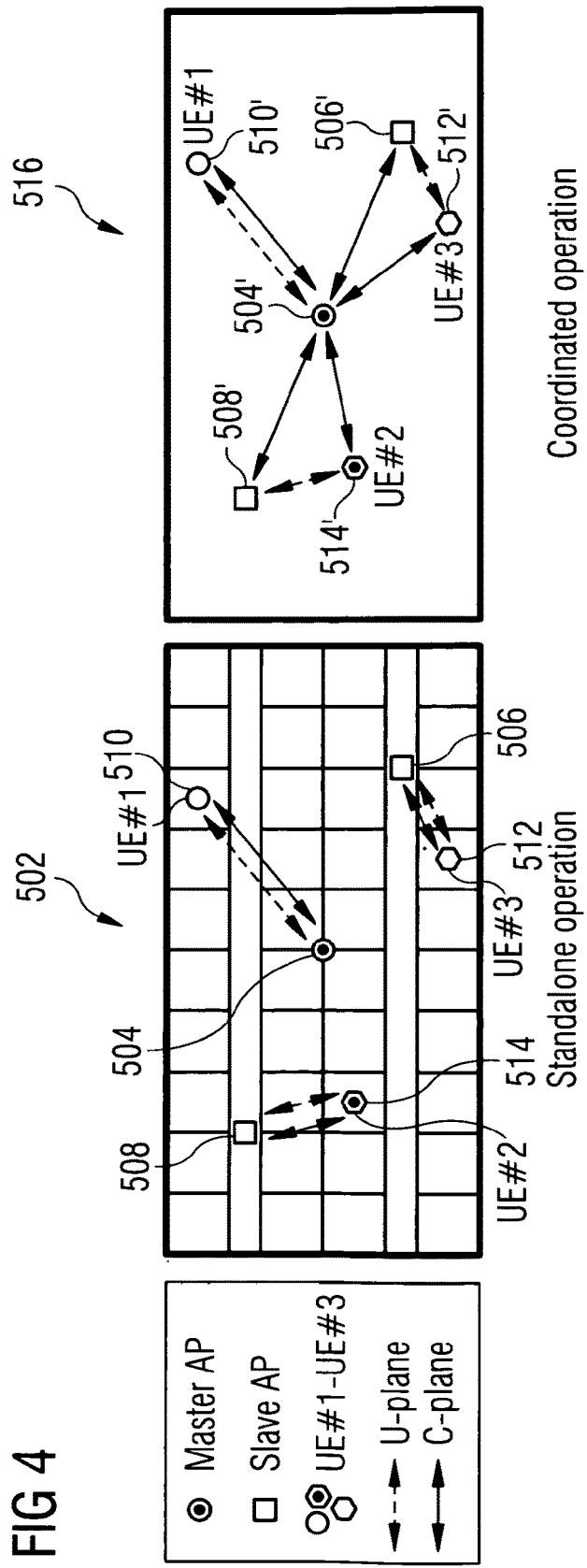
FIG. 4 illustrates standalone and co-ordinated communication according to an embodiment.

FIG. 4 shows stand-alone and coordinated operation according to an embodiment. The stand-alone operation comprises a traditional deployment where each access point (whether master or slave) forms its own cell. Traditionally, the scheduling arrangement is applied such that the UE listens to scheduling information received from either or both of the master and slave access point on the control plane, and then scheduled data is transmitted or received on the user plane at predetermined times according to a received scheduling grant.

In one embodiment of the coordinated operation, the slave APs and UEs listen to scheduling information received from the master AP. In some embodiments the control plane and user plane are physically separated and the control plane contains separate control signalling portions to receive and transmit scheduling related control information. The user plane can be conveyed via the master access point or directly between end nodes.

An exemplifying stand-alone operation is shown at 502. The system comprises a master AP 504, slave APs 506 and 508, and UEs 510, 512 and 514. Control plane connections are represented by the solid arrows and the user plane connections are represented by the dotted arrows. The master AP 504 is in control plane and user plane connection with the UE 510. The slave AP 506 is in control plane and user plane connection with UE 512. The slave AP 508 is in control plane and user plane communication with UE 514. As discussed, there is no dynamic scheduling coordination between the access points.

An exemplifying coordinated operation is shown at 516. The master access point is shown at 504'. The slave access points are shown at 506' and 508'. The user equipment are shown at 510', 512' and 514'. Again, the control plane is represented by the solid arrows, and the user plane is represented by the dotted arrows. The master AP 504' is in user plane communication with the UE 510'. The slave AP 506' is in user plane communication with UE 512'. The slave AP 508' is in user plane communication with UE 514'. The master AP 504' is also in control plane communication with each of the slave APs and each of the UEs. Accordingly they can act in a coordinated fashion i.e. their dynamic scheduling can take account of each other's presence.

It should of course be understood FIG. 4 is by way of example only, and that more or fewer access points and user equipment may be present at any time.

Figure 5:
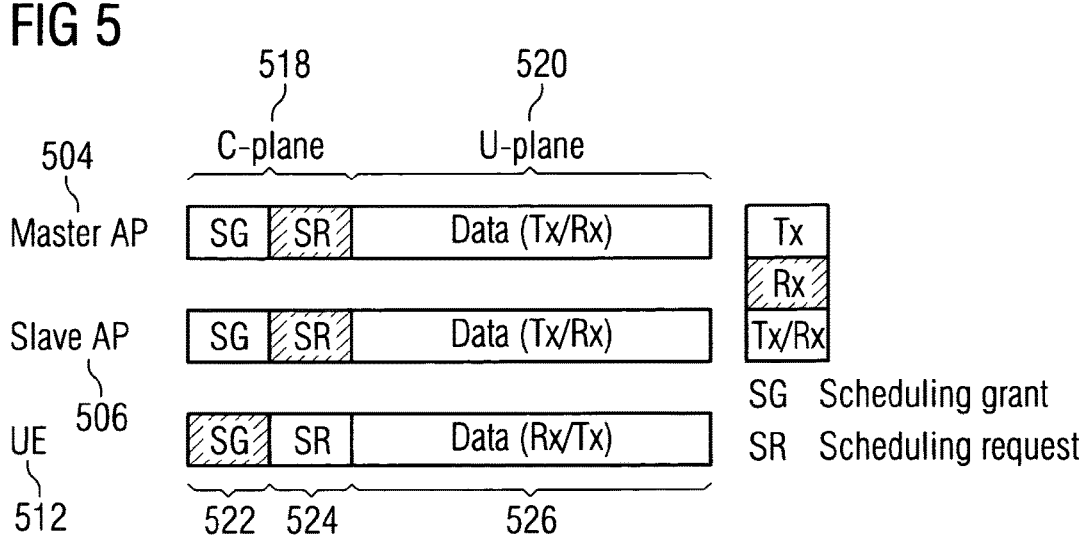
FIG. 5 illustrates standalone operation.

FIG. 5 shows an example of scheduling configuration according to a stand-alone operation mode. For simplicity and ease of understanding this example shows a master AP 504, slave AP 506, and UE 512. The transmit/receive portions comprise control plane portion 518, and user plane portion 520. The control plane signalling may comprise scheduling grant (SG) signalling, and scheduling request (SR) signalling. These may be seen also in a wider context to represent examples of L1/L2 downlink (such as SG) and uplink (such as SR) signalling, respectively. For the control plane signalling 518, transmission periods are shown by the shaded boxes, and receive portions are shown by the hatched boxes. The user plane communication comprises a mixture of transmission and reception of data.

In a first time period 522 the master AP 504 transmits a scheduling grant, or has an opportunity to transmit a scheduling grant, as does slave AP 506. During this period the UE 512 receives, or has an opportunity to receive, the scheduling grant. In embodiments each of the master AP 504 and slave AP 506 may form their own cell, in which case the UE 512 is configured to receive a scheduling grant from its own AP only e.g. the UE 512 may receive the scheduling grant from the slave AP 506 only. In this way interference may be avoided. In another embodiment, the UE 512 may be able to receive a scheduling grant from any master/slave AP.

In some embodiments it is possible to receive scheduling grant from multiple APs (the same applies to reception of scheduling requests by multiple APs). The grants/requests may or may not be conflicting with respect to each other. In embodiments means may be provided to handle such conflicts. They can be handled for example by means of predetermined prioritization rules and/or error case handling procedures.

In time period 524 the master AP 504 receives a scheduling request, or has an opportunity to receive a scheduling request, as does slave AP 506. In this time period the UE 512 is transmitting the scheduling request. In embodiments the scheduling request may be received only at the AP controlling the UE e.g. the scheduling request may be received at the slave AP 506 only. In another embodiment, any AP (master/slave) may be able to receive a scheduling grant from any UE. During time period 526 the master AP 504, slave AP 506, and UE 512 transmit and receive data on the user plane in accordance with the arranged scheduling.

Figure 6:
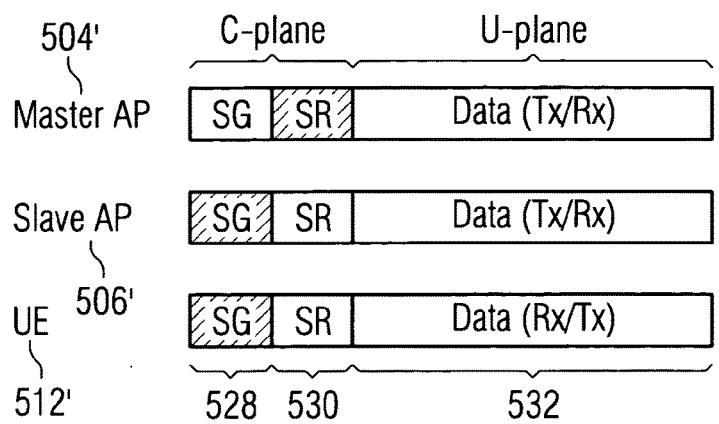
FIG. 6 illustrates co-ordinated operation according to an embodiment.

FIG. 6 shows an example of a coordinated operation mode. In this figure both the slave AP 506' and the UE 512' are able to receive or transmit scheduling information transmitted from or received by master AP 504'. However, UE 512' is not able to receive or transmit scheduling information transmitted from or received by the slave AP 506'.

During time period 528 the master AP is able to transmit a scheduling grant, and both the slave AP 506' and UE 512' are able to receive the scheduling grant. During time period 530 the master AP 504' is able to receive a scheduling request, and both the slave AP 506' and the UE 512' are able to send scheduling requests. During time period 532 data is received and transmitted between the master AP 504', slave AP 506', and UE 512' according to the determined scheduling.

Accordingly it can be appreciated that the master and slave AP are operating in a coordinated manner i.e. the slave AP is configured to receive a scheduling grant during a time period where the scheduling grant is being transmitted by the master AP, and the master AP is configured to receive a scheduling request during a time period in which the slave AP is configured to send a scheduling request. This may reduce interference in the co-ordinated mode.

Any of the nodes i.e. master AP, slave AP and UE may receive an instruction to operate in a coordinated or uncoordinated mode. This instruction could come from any other of the master AP, slave AP and UE, or from a higher network node. Alternatively each of the UE, slave AP and master AP may be preconfigured to operate in one of a coordinated and uncoordinated mode.

Figure 8:
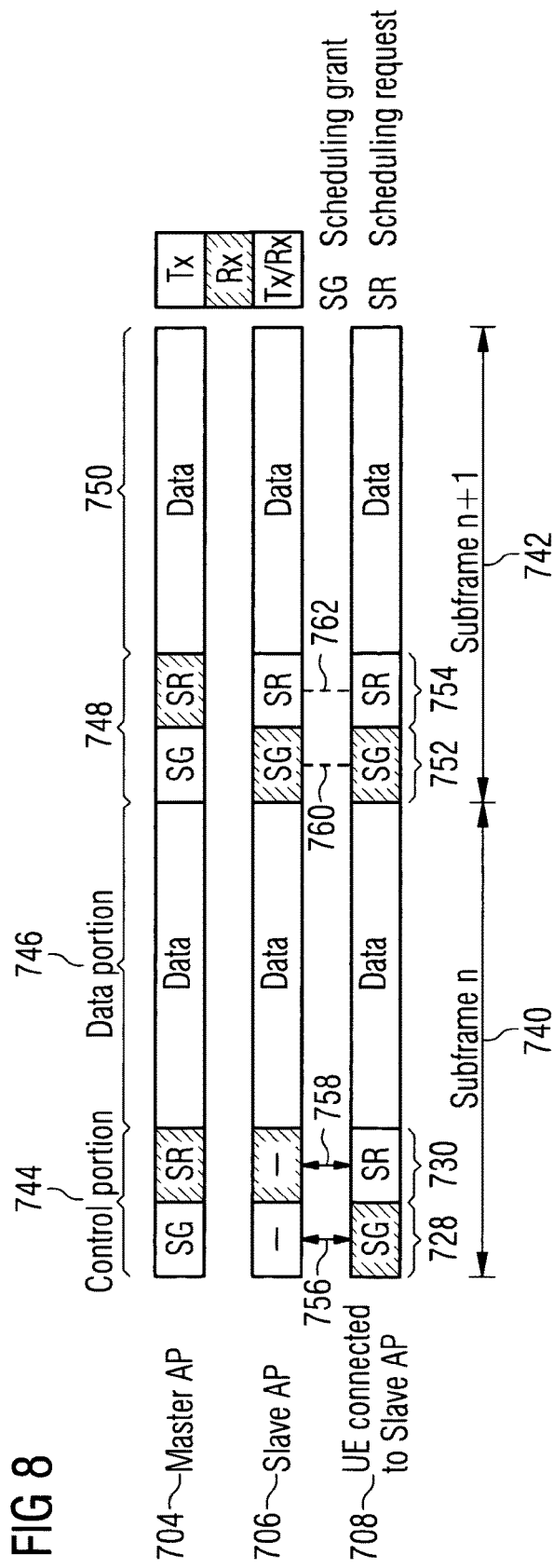
FIG. 8 illustrates co-ordinated operation according to another embodiment.
Figure 9:
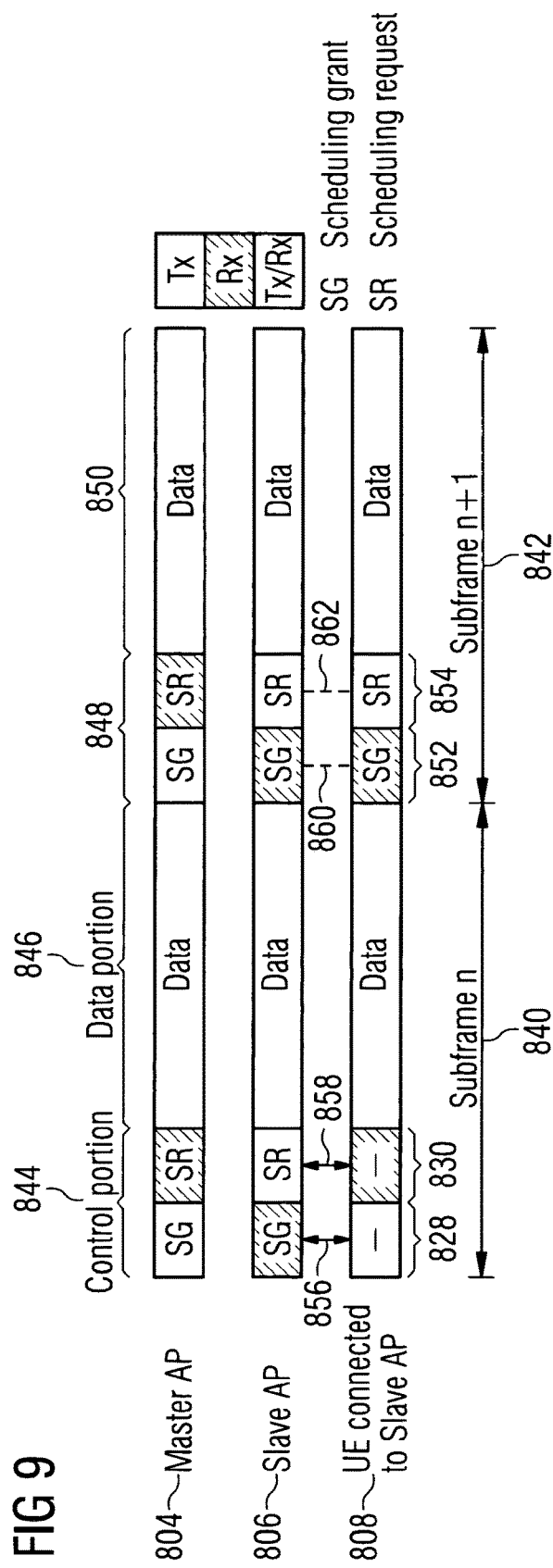
FIG. 9 illustrates co-ordinated operation according to another embodiment.

In some embodiments the slave AP, and UEs connected to the slave AP, can alternate transmit and receive portions of the scheduling information from timeslot to timeslot in order to allow scheduling from both master AP and slave AP in consecutive time instances (e.g. subframes). For example, in some embodiments the UE may receive scheduling information from the master AP in a first subframe, and then receive scheduling information from the slave AP in the next subframe, and so on. In some embodiments the scheduling information may contain information about slave AP resources. Three such embodiments showing coordinated behaviour are shown in FIGS. 7, 8 and 9.

Figure 7:
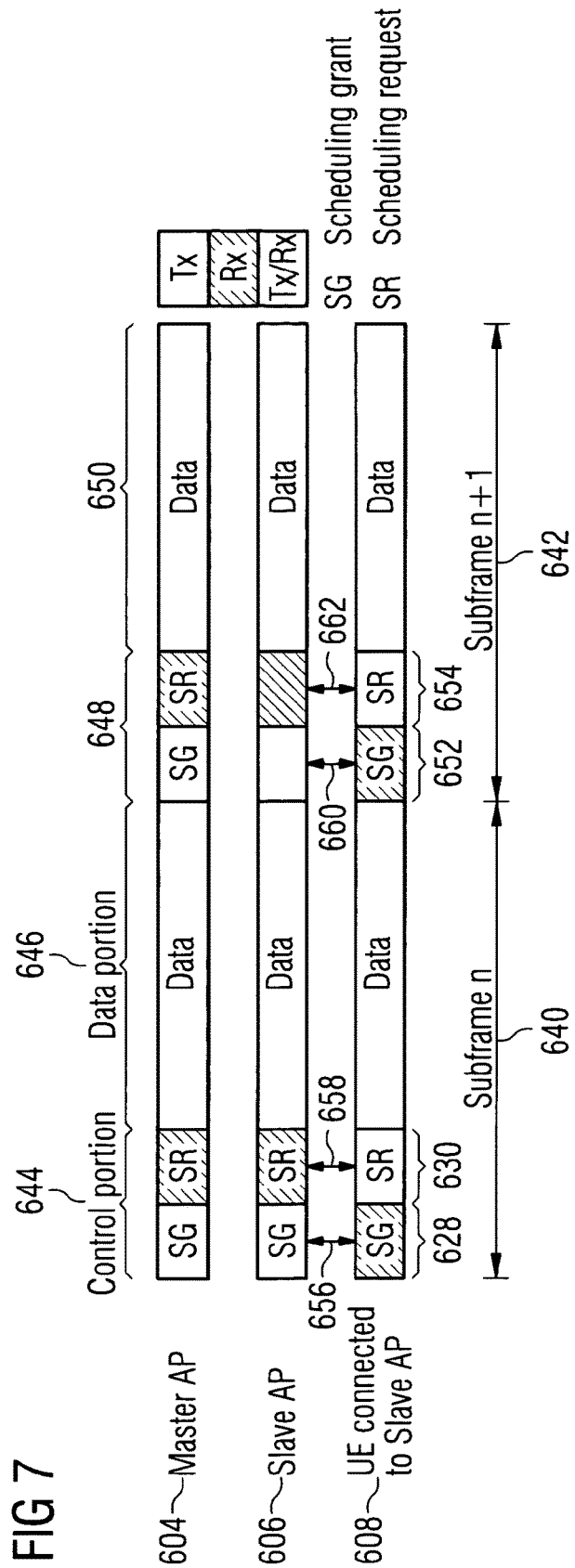
FIG. 7 illustrates co-ordinated operation according to another embodiment.

FIG. 7 shows two consecutive subframe periods, 640 (subframe n) and 642 (subframe n+1). Subframe n comprises a control portion 644 and a data portion 646. Subframe n+1 comprises a control portion 648 and a data portion 650.

In time period 628 of control portion 644 the master AP 604 is able to transmit a scheduling grant, and the slave AP 606 is able to receive the scheduling grant. In time period 630 of control portion 644 the slave AP 606 is able to transmit a scheduling request, and the master AP 604 is able to receive the scheduling request. In some embodiments the scheduling information may contain information about slave AP resources. Data is then transmitted between the master AP 604, slave AP 606, and the UE 608 according to the scheduling regime determined between the master AP 604 and slave AP 606.

In time period 652 of subframe n+1 the master AP 604 is able to transmit the scheduling grant, and the UE 608 is able to receive the scheduling grant. In time period 654 of control portion 648, the UE 608 is able to transmit a scheduling request, and the master AP 604 is able to receive the scheduling request. In time period 650 data is transmitted and received between master AP 604, slave AP 606 and the UE 608, in accordance with the determined scheduling regime.

In the embodiment of FIG. 7 the slave AP 606 maintains a control connection to UE 608 at all times. This control connection is represented by arrows 656, 658, 660 and 662. It will of course be appreciated that the slave AP 606 may have a control connection with any number of UEs, and that one UE (608) is shown in FIG. 7 for ease of understanding. The connection between the slave AP and UE may be continuous, or in other embodiments may be discontinuous.

By virtue of this "control connection" the slave AP 606 and UE 608 can receive the scheduling grant from the master AP 604, even when not in direct communication with the master AP 604. For example in time period 628 of control portion 644, the master AP 604 is able to send the scheduling grant, and the slave AP 606 is able to receive the scheduling grant. The UE 608 is made aware of the scheduling grant by virtue of the control connection 656 with the slave AP 606. In time period 630 the UE is made aware of the scheduling request by virtue of control connection 658.

Likewise in time period 652 of control portion 648 of subframe n+1, the slave AP 606 may be made known of the scheduling grant received at UE 608 by virtue of control connection 660. The slave AP 606 is also made aware of the scheduling request transmitted by the UE 608 at time period 654, by virtue of control connection 662.

It can thus be understood that the Tx/Rx portions of the scheduling information may be swapped in consecutive subframes such that UEs connected to the slave AP 606 can follow the pattern of slave AP 606. As discussed above, the bi-directional control connection between the slave AP 606 and UE 608 may be maintained at all times. The control connection between the slave AP 606 and master AP 604 is typically available in every second subframe. Likewise a control connection between the UE 608 and the master AP 604 is also available in every second subframe, but offset from the control connection of slave AP 606 e.g. the control connection between slave AP and master AP, and UE and master AP, may be alternated between subframes. The available connection is indicated by "SG/SR". For example in control portion 644 there is a control connection between master AP 604 and slave AP 606. In control portion 648 of subframe n+1 there is a control connection between UE 608 and master AP 604.

In another embodiment, shown in FIG. 8, the UE 708 maintains a control connection to the master AP 704 at all times. This available connection is indicated by "SG/SR". A control connection between the slave AP 706 and UE 708 is available in every second subframe. The available connection is indicated by arrows 756 and 758. The unavailable connection is indicated by dotted lines 760 and 762.

In time period 728 of control portion 744 of subframe n, the master AP 704 may transmit a scheduling grant, and the UE 708 may receive the scheduling grant. By virtue of control connection indicated by arrow 756, the slave AP 706 can be informed of the scheduling grant by the UE 708. In time period 730 the UE 708 may transmit a scheduling request, and the master AP 704 may receive the scheduling request. By virtue of the control connection between the slave AP and the UE indicated by arrow 758, the slave AP can be informed of the scheduling request by the UE 708. In data portion 746 data is transmitted and received between the master AP, slave AP and UE according to the determined scheduling.

In time period 752 of the next subframe n+1 742, the master AP 704 is able to transmit a new scheduling grant, and this scheduling grant is capable of being received by both the slave AP 706 and the UE 708. In the time period 754 both the slave AP 706 and the UE 708 are able to transmit scheduling requests to the master AP 704. Then in data portion 750 data may be transmitted between the nodes according to the agreed scheduling. In some embodiments there may be dedicated scheduling request resources for both the slave AP and the UE. These resources can be separated, for example in the frequency domain.

FIG. 9 shows a further embodiment in which the slave AP 806 maintains a control connection with the master AP 804 at all times. Accordingly the slave AP 806 can follow the pattern of the master AP 804. In other words a bi-directional control connection may be maintained between the master AP 804 and the slave AP 806 at all times. This control connection is indicated by "SG/SR". A control connection between UE 808 and slave AP 806 is available in every second subframe. In subframe n 840 this control connection is indicated by arrows 856 and 858. In subframe n+1 842 the unavailable connection is indicated by the dotted lines 860 and 862.

In time period 828 of subframe n, the master AP 804 is able to transmit a scheduling grant. The scheduling grant is capable of being received by the slave AP 806. By virtue of the control connection between the slave AP 806 and the UE 808, indicated by arrow 856, the UE 808 may be made aware of the scheduling grant. In time period 830 of subframe n, the slave AP 806 is able to transmit a scheduling request. The scheduling request is capable of being received by master AP 804. By virtue of the control connection between the slave AP 806 and the UE 808, indicated by arrow 850, the UE 808 may be made aware of the scheduling request. During data portion 846 of subframe n the data is transmitted and received between the master AP, slave AP and UE. In subframe n+1, the master AP 804 is able to transmit a scheduling grant, which is capable of being received by both the slave AP 806 and UE 808 in the time period 852. In time period 854 both the UE 808 and the slave AP 806 are able to transmit a scheduling request, and this scheduling request is capable of being received by the master AP 804. During time period 850 data may be communicated between the master AP, slave AP and UE according to the agreed scheduling.

Thus it can be appreciated in both FIGS. 8 and 9 that in subframe n the master AP has a control connection with one or other of the slave AP 806 and the UE 808. A separate control connection between the slave AP 806 and the UE 808 means that the slave AP 806 can schedule the UE 808. In subframe n+1 the master AP 804 has a control connection with both the slave AP 806 and the UE 808. Therefore in subframe n+1 there is no requirement for a separate control connection between the slave AP and the UE.

It will be appreciated that although FIGS. 7, 8 and 9 show the slave AP and UE changing Tx/Rx periods on a subframe by subframe basis this could be varied so as to change after any number of subframes or frames.

Figure 10:
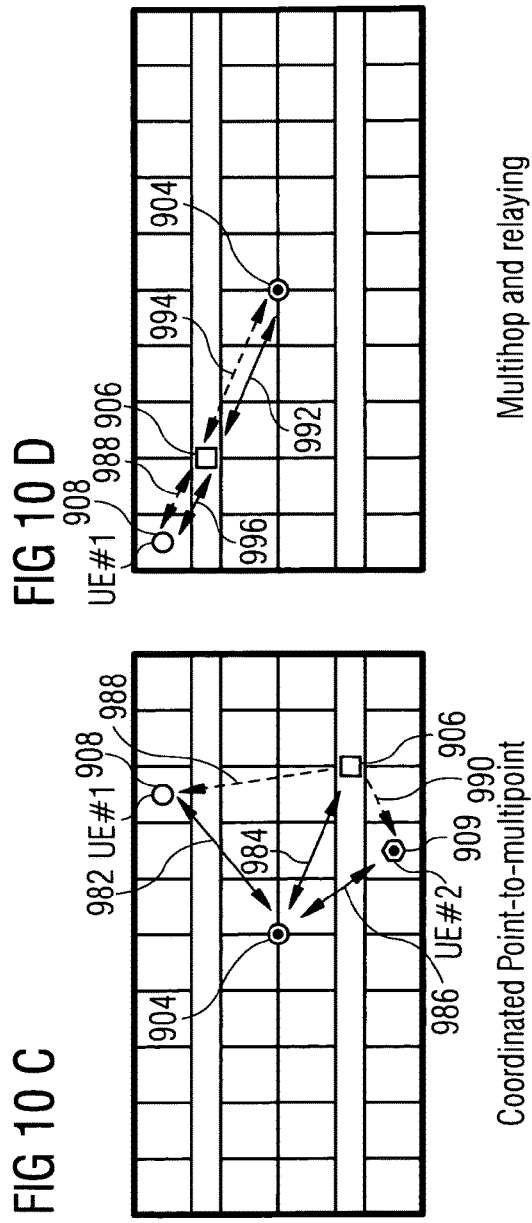
FIG. 10 illustrates use cases according to embodiments.

The embodiments of FIGS. 7, 8 and 9 can be applied to at least the following cases:
- multi-hop relaying can be supported by scheduling one hop at a time
- uplink or downlink scheduling between any slave AP and any UE
- device to device (D2D) communications between any UE pair within a collaboration area
- access point to access point (AP2AP) communications between any AP pair within a collaboration area
- coordinated point to multipoint Some of these use cases are shown in FIGS. 10(*a*) to 10(*d*), which are schematic diagrams of an example building in which each square box (e.g. box 901) represents a room, and each of the rectangular unshaded boxes e.g. box 903 represents a corridor.

FIG. 10(*a*) shows an example of coordinated D2D communication. The master AP 904 has a control plane connection with slave AP 906 and UE 908. The control plane connection is indicated by arrows 970 and 972. The slave AP 906 and UE 908 can communicate on user plane connection designated by dotted arrow 974. Accordingly the UE 908 and slave AP 906 can coordinate by virtue of their control plane connections with master access point 904.

FIG. 10(*b*) shows an example of coordinated access point to access point connection. The master AP 904 is in control plane connection with slave access points 905 and 906. These control plane connections are shown by arrows 976 and 978. Each slave access point 905 and 906 can communicate data with each other by virtue of user plane connection shown by dotted arrow 980. Thus both slave access points 905 and 906 can operate under the control of master access point 904, and therefore can coordinate communications.

FIG. 10(*c*) shows an example of coordinated point to multipoint communication. The master AP 904 has control plane connections 982, 984 and 986 respectively with UE 908, slave AP 906, and UE 909. The slave AP 906 also has use plane connections 988 and 990 with UE 908 and UE 909 respectively. Accordingly by virtue of the control plane connections 982, 984 and 986 between the master AP 904 and the UEs 908, 909 and the slave AP 906, they can each act in a coordinated fashion.

FIG. 10(*d*) shows an example of multi-hop and relaying scenario. The master AP 904 has both a control plane connection 992 and a user plane connection 994 with slave AP 906. The slave AP 906 also has control plane connection 996 and a user plane connection 998 with UE 908. By virtue of these connections the master AP 904, slave AP 906, and UE 908 can operate in a coordinated fashion.

Figure 11:
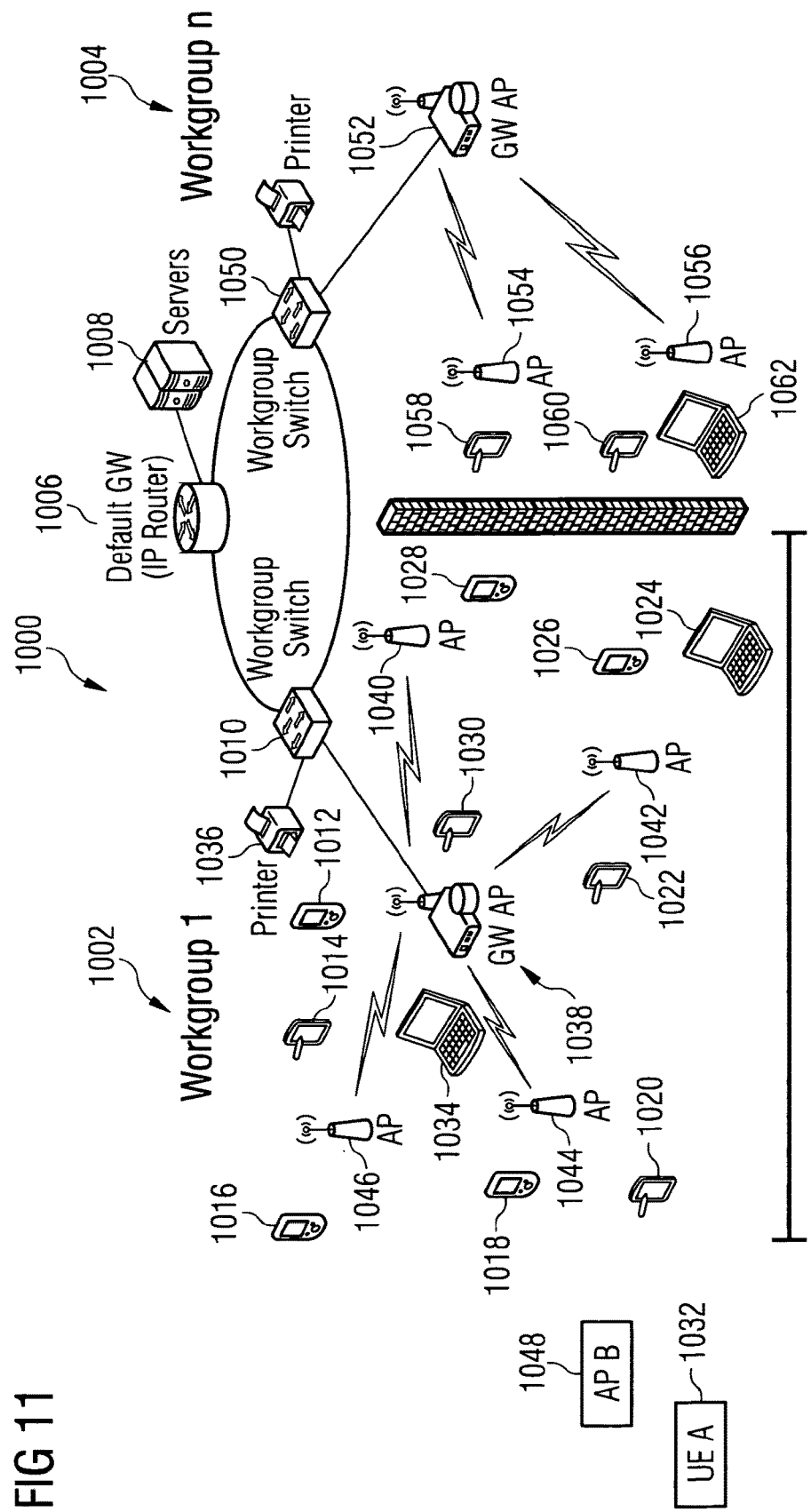
FIG. 11 illustrates a local area deployment according to an embodiment.

An example of a local area deployment according to an embodiment is shown in FIG. 11. The local area 1000 comprises "Workgroup 1" 1002 and "Workgroup n" 1004. Workgroup 1 is connected to default gateway (IP router) 1006 and servers 1008 via workgroup switch 1010. Workgroup 1 is densely populated and comprises user equipment 1012, 1014 1016, 1018, 1020, 1022, 1024, 1026, 1028, 1030, 1032 and 1034. Workgroup 1 also comprises a printer 1036. Workgroup switch 1010 is in communication with gateway access point 1038. Gateway access point 1038 is in communication with further access points 1040, 1042, 1044, 1046, and 1048. In some embodiments each of the access points may be connected to the internet via a cable connection, with no further cable connections between the access points.

As discussed above, workgroup 1 is densely populated and therefore would benefit from coordination between the access points. Accordingly one AP may be designated a master AP and take care of resource allocation with all other APs in workgroup 1. In one embodiment gateway access point 1038 is designated the master access point, with all other APs designated as slave access points. A coordinated scheduling regime, as shown for example in FIG. 6, may be used in a deployment such as workgroup 1.

Workgroup n is connected to default gateway 1006 and servers 1008 via workgroup switch 1050. Workgroup n comprises a gateway access point 1052, and further access points 1054 and 1056. UEs 1058, 1060 and 1062 are located within workgroup n. Workgroup n may be considered a sparsely populated workgroup and therefore it may be unnecessary for the access points to operate in a coordinated manner since the traffic levels will be relatively low. Accordingly the access points may operate in a standalone fashion, as shown for example in FIG. 5.

"Self-back hauling" may also be implemented in the deployment of FIG. 11. In such a case, the workgroup 1 may be wirelessly deployed i.e. no cable connections between the internet and APs. Only the gateway AP 1038 may be connected to the internet via a cable.

If the gateway AP 1038 receives a packet which is targeted for UE 1032, then gateway AP 1038 may in some circumstances be unable to transmit this packet to UE 1032, for example because of path loss. In such a case it may be necessary for the packet to be relayed via another access point, such as AP 1048. In such a situation the scheduling resources may be configured in the manner of FIG. 9 in order to allow scheduling between the gateway AP 1038 and AP 1048 in subframe n, and between AP 1048 and UE 1032 in subframe n+1.

It will be appreciated that variations of the embodiments shown in the Figures are envisaged. For example there may be more or fewer access points and UEs than those disclosed. The UEs can be of any type e.g. mobile phone, tablet, laptop, PDA etc. The access points can be of various types e.g. e-nodeB, pico-nodeB, micro-nodeB, femto-nodeB, base station etc. There may also be a mixture of any of these access points within a deployment.

The designation of "slave" and "master" access points may also be dynamically varied. For example a master access point may become a slave access point and vice versa. In some embodiments it may also be possible for a UE to become a master or slave AP.

The determination as to which mode to operate in i.e. stand-alone or coordinated may be made by any of the nodes in the system. For example the determination could be made by a UE, a slave AP or a master AP. This determination may also be made by a higher network node, for example a gateway node or a node in the core network. Alternatively each node may be pre-configured to operate as one of a slave access point or master access point.

Figure 12A:
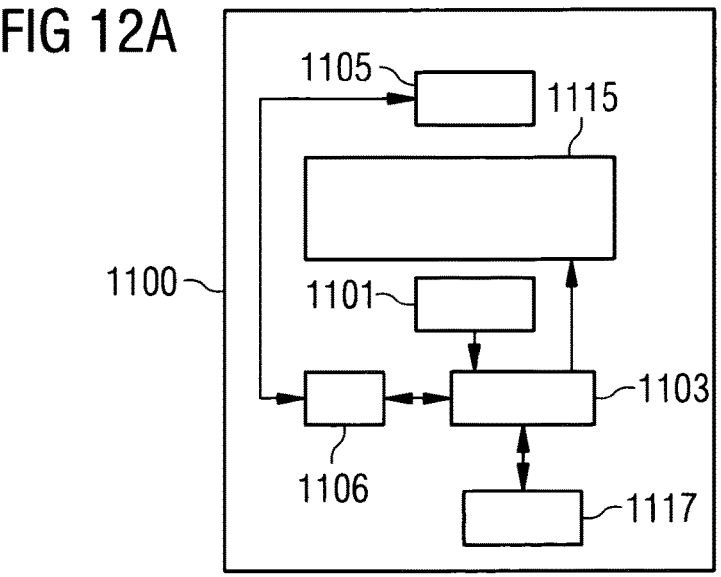
FIG. 12(a) illustrates an example of apparatus for use at a user equipment (UE) in FIG. 1, according to another embodiment.
Figure 12B:
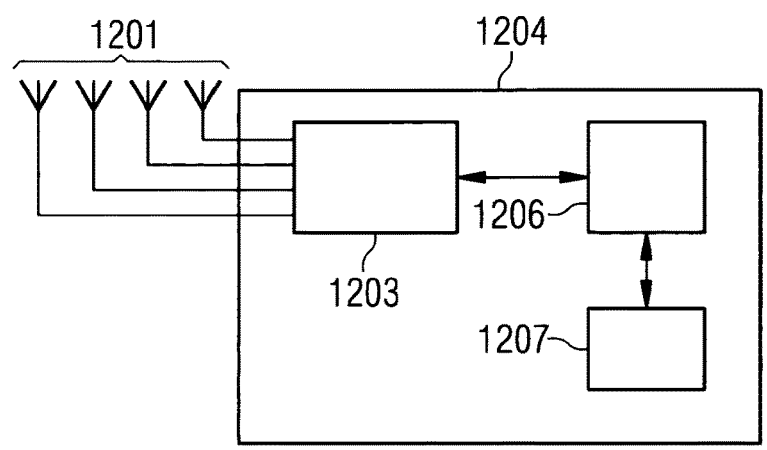
FIG. 12(b) illustrates an example of apparatus for use at a relay node (RN) (or node) in FIG. 1, according to another embodiment.
Figure 12C:
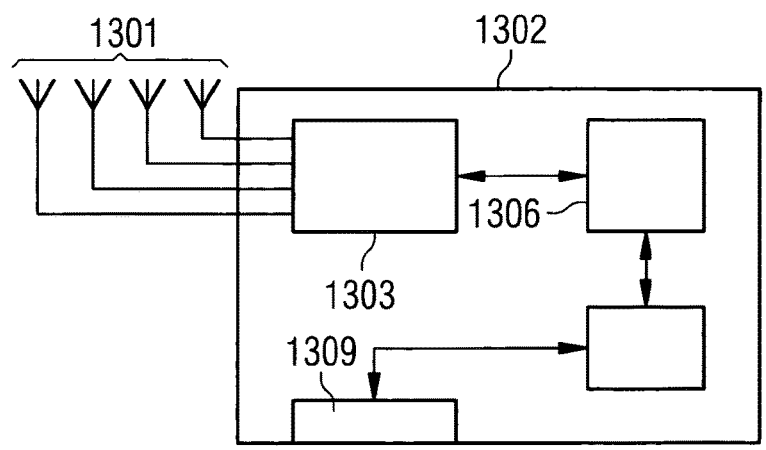
FIG. 12(c) illustrates an example of apparatus for use at an access point (AP) in FIG. 1, according to another embodiment.

FIGS. 12(*a*) to 12(*c*) respectively show a user equipment, a relay node (RN) or slave access point; and an access point such as a master access point according to a further embodiment.

Referring to FIG. 12(*a*) the UE 1100 may communicate via transceiver means 1106 and associated antenna means 1105. The antenna means 1105 may comprise combined receiving means and transmitting means or separate transmitting means and receiving means. The antenna means 1105 may be arranged internally or externally to the UE 1100.

The UE 1100 may be provided with at least one processing means 1103 and at least one memory means 1117 for use in tasks it is designed to perform. The processing means 1103 and memory means 1117 may be provided on an appropriate circuit board and/or in chipsets. The memory means is typically internal but may also be external or a combination thereof, such as in the case when additional memory capacity is obtained from a service provider.

In the cases of devices designed for human interaction, the user may control the operation of the UE 1100 by means of input means 1101, voice commands, touch sensitive screen or pad, combinations thereof or the like. Display means 215, speaker means and microphone means may also be provided. Furthermore, the UE 1100 may comprise appropriate connector means (either wired or wireless) to other devices and/or for connecting external accessories, for example hands-free equipment, thereto.

It will be understood that the above described user equipment 1100 and its associated means or facilities may be configured to operate in accordance with the embodiments described above. In particular, processing means 1103 may be configured to cause the user equipment 1100 to operate in the described manner. The processing means 1103 may comprise a single processing means arranged to carry out a number of tasks, or may comprise a number of processing means each configured to carry out one or more tasks.

An example of an apparatus for use at a user device comprises means 1106 (optionally also means 1105) for receiving, information from a node, said information defining a mode of operation for communicating scheduling information and means 1103 for configuring transmission and reception periods of scheduling information at said apparatus in dependence on the mode of operation.

Another example of an apparatus may include at least one processor, controller, unit or module 1103 and at least one memory including a computer program code, the at least one memory and the computer program code configured to, with the at least one processor, controller, unit or module, cause the apparatus at least to: receive information from a node, said information defining a mode of operation for communicating scheduling information and configure transmission and reception periods of scheduling information in dependence on the mode of operation.

Referring to FIG. 12(*b*), this shows an example of apparatus for use at the RNs of FIG. 1. The apparatus 1204 comprises or is coupled to a radio frequency antenna means 1201 configured to receive and transmit radio frequency signals; radio transceiver circuitry means 1203 configured to interface the radio frequency signals received and transmitted by the antenna means 1201, and processing means 1206. The antenna means 1201 may comprise combined receiving and transmitting means, or may comprise separate receiving means and transmitting means. The processing means 1206 is configured to process signals from the radio transceiver 1203. It may also control the radio transceiver 1203 to generate suitable RF signals to communicate information to another of the nodes (UE or AP) via the wireless communications link. The memory means 1207 is used for storing data, parameters and/or instructions for use by the processing means 1206. The memory means or data storage means may be internal or external (located in another network entity) or a combination thereof.

It will be understood that the above described apparatus 1204 and its associated means or facilities may be configured to operate in accordance with the embodiments described above. In particular, processing means 1207 may be configured to cause the apparatus 1204 to operate in the described manner. The processing means 1207 may comprise a single processing means arranged to carry out a number of tasks, or may comprise a number of processing means each configured to carry out one or more tasks.

An example of an apparatus for use at a node or relay node comprises means 1203 (optionally also means 1201) for receiving, information from a node, said information defining a mode of operation for communicating scheduling information and means 1207 for configuring transmission and reception periods of scheduling information at said apparatus in dependence on the mode of operation.

Another example of an apparatus may include at least one processor, controller, unit or module 1207 and at least one memory including a computer program code, the at least one memory and the computer program code configured to, with the at least one processor, controller, unit or module, cause the apparatus at least to: receive information from a node, said information defining a mode of operation for communicating scheduling information and configure transmission and reception periods of scheduling information in dependence on the mode of operation.

FIG. 12(*c*) shows an example of apparatus for use at the AP 2 of FIG. 1. The apparatus 1302 comprises or is coupled to a radio frequency antenna means 1301 (comprising at least one antenna or antenna unit) configured to receive and transmit radio frequency signals; radio transceiver circuitry means, module or unit 1303 configured to interface the radio frequency signals received and transmitted by the antenna means 1301, and processing means 1306. The antenna means 1301 may comprise combined receiving and transmitting means, or may comprise separate receiving means and transmitting means. The apparatus 1302 usually comprises an interface means 1309 via which, for example, it can communicate with other network elements such as the core network (not shown). The processing means 1306 is configured to process signals from the radio transceiver means 1303. It may also control the radio transceiver means 1303 to generate suitable RF signals to communicate information to another of the nodes (UE or RN) via the wireless communications link, and also to exchange information with other network nodes across a wired link via the interface means 1309. The memory means 1307 is used for storing data, parameters and/or instructions for use by the processing means 1306. The memory means or data storage means may be internal or external (locating in another network entity) or a combination thereof.

It will be understood that the above described apparatus 1304 and its associated means or facilities may be configured to operate in accordance with the embodiments described above. In particular, processing means 1307 may be configured to cause the apparatus 1304 to operate in the described manner. The processing means 1307 may comprise a single processing means arranged to carry out a number of tasks, or may comprise a number of processing means each configured to carry out one or more tasks.

An example of apparatus for use at the AP 2 comprises means 1307 for controlling a transmission, to at least one apparatus, of information from a node, said information defining a mode of operation for communicating scheduling information, wherein said information transmitted from said node is configured to cause said at least one apparatus to configure transmission and reception periods of scheduling information in dependence on the mode of operation.

Another example of an apparatus may include at least one processor, controller, unit or module 1307 and at least one memory including a computer program code, the at least one memory and the computer program code configured to, with the at least one processor, controller, unit or module, cause the apparatus at least to: control a transmission, to at least one further apparatus, of information, said information defining a mode of operation for communicating scheduling information, wherein said information is configured to cause said at least one further apparatus to configure transmission and reception periods of scheduling information in dependence on the mode of operation.

As described above, the scheduling information may comprise at least one of a scheduling grant and a scheduling request.

The mode of operation may define at least one parameter relating to the scheduling information. The at least one parameter may comprise at least one of: transmission time interval (TTI); scheduling timing; and hybrid automatic repeat request acknowledgement/non-acknowledgement timing Accordingly the control signalling loop e.g., from data scheduled via master AP may be reduced compared to that of data scheduled via slave AP. In some embodiments this may be compensated by increased TTI length.

Some embodiments may allow fast coordinated scheduling between UEs and APs. Similar gain mechanisms may also be available in coordinated scheduling (COMP). Embodiments may also provide flexible support for various traffic types such as multi-hop, self back-hauling, network assisted D2D, AP2AP and multipoint reception/transmission. Embodiments may also allow distributed handling of the UE. Embodiments may also support various back haul deployments, and may also support distributed operation. In some embodiments the mode can be switched between standalone mode and coordinated mode in dependence on a requirement basis. Accordingly the coordinated operation modes may provide "capacity evolution path" for the local area service providers.

An appropriately adapted computer program code product or products may be used for implementing the embodiments, when loaded on an appropriate data processing apparatus, for example for determining geographical boundary based operations and/or other control operations. The program code product for providing the operation may be stored on, provided and embodied by means of an appropriate carrier medium. An appropriate computer program can be embodied on a computer readable record medium which may be a non-transitory medium. A possibility is to download the program code product via a data network. In general, the various embodiments may be implemented in hardware or special purpose circuits, software, logic or any combination thereof. Embodiments of the inventions may thus be practiced in various components such as integrated circuit modules, application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, digitally enhanced circuits, or a combination thereof. For firmware or software, the implementation may be carried out through modules of at least one chip set. The design of integrated circuits is by and large a highly automated process. Complex and powerful software tools are available for converting a logic level design into a semiconductor circuit design ready to be etched and formed on a semiconductor substrate.

It is also noted herein that while the above describes exemplifying embodiments of the invention, there are several variations and modifications which may be made to the disclosed solution without departing from the scope of the present invention.

The invention claimed is:

1. The method comprising:
receiving, at an apparatus, information from a node, said information defining a mode of operation for communicating scheduling information, wherein said mode of operation comprises at least one of a stand-alone mode and a coordinated mode in a system comprising a master access node, at least one slave access node and at least one user equipment; and
configuring transmission and reception periods of scheduling information at said apparatus in dependence on the mode of operation, wherein the scheduling information comprises at least one of the following: a scheduling grant and a scheduling request.

2. The method as set forth in claim 1 wherein, when operating in said coordinated mode, said method comprises configuring said apparatus to coordinate transmission and reception periods with a second apparatus, and when operating in said stand-alone mode, said method comprises configuring transmission and reception intervals of said apparatus independently of said second apparatus.

3. The method as set forth in claim 2 wherein, when operating in said coordinated mode, said method comprises: configuring said apparatus to communicate scheduling information with said node in coordination with said second apparatus.

4. The method as set forth in claim 2 comprising at least one of the following:
configuring said apparatus to communicate scheduling information with said node during a time period in which said second apparatus is not communicating scheduling information with said node;
configuring said apparatus not to communicate scheduling information with said node during a time period in which said second apparatus is communicating scheduling information with said node;
coordinating scheduling information such that said apparatus is configured to transmit scheduling information during a time period when said second apparatus is receiving scheduling information, and to receive scheduling information during a time period when said second apparatus is transmitting scheduling information.

5. The method as set forth in claim 1, wherein said mode of operation defines at least one parameter relating to said scheduling information, and wherein said at least one parameter comprises at least one of: transmission time interval; scheduling timing; and hybrid automatic repeat request acknowledgement/non-acknowledgement timing.

6. An apparatus comprising
at least one processor;
and at least one memory including computer program code;
the at least one memory and the computer program code configured to, with the at least one processor, cause the apparatus at least to:
receive information from a node, said information defining a mode of operation for communicating scheduling information, wherein said mode of operation comprises at least one of a stand-alone mode and a coordinated mode in a system comprising a master access node, at least one slave access node and at least one user equipment; and
configure transmission and reception periods of scheduling information in dependence on the mode of operation, wherein the scheduling information comprises at least one of the following: a scheduling grant and a scheduling request.

7. The apparatus as set forth in claim 6 wherein, when operating in said coordinated mode, said apparatus is configured to coordinate transmission and reception periods with a second apparatus, and when operating in said stand-alone mode, said apparatus is configured to configure transmission and reception intervals independently of said second apparatus.

8. The apparatus as set forth in claim 7 wherein, when operating in said coordinated mode, said apparatus is configured to communicate scheduling information with said node in coordination with said second apparatus.

9. The apparatus as set forth in claim 7, wherein the apparatus is configured to perform at least one of the following:
the apparatus is configured to communicate scheduling information with said node during a time period in which said second apparatus is not communicating scheduling information with said node; the apparatus is configured not to communicate scheduling information with said node during a time period in which said second apparatus is communicating scheduling information with said node; and
the apparatus is configured to coordinate scheduling information such that said apparatus is configured to transmit scheduling information during a time period when said second apparatus is receiving scheduling information, and to receive scheduling information during a time period when said second apparatus is transmitting scheduling information.

10. The apparatus as set forth in claim 9, wherein said time period comprises at least one frame or at least one subframe.

11. The apparatus as set forth in claim 6, wherein said mode of operation defines at least one parameter relating to said scheduling information, and wherein said at least one parameter comprises at least one of: transmission time interval; scheduling timing; and hybrid automatic repeat request acknowledgement/non-acknowledgement timing.

12. A method comprising:
controlling a transmission, to at least one apparatus, of information from a node, said information defining a mode of operation for communicating scheduling information, wherein said mode of operation comprises at least one of a stand-alone mode and a coordinated mode in a system comprising a master access node, at least one slave access node and at least one user equipment;
wherein said information transmitted from said node is configured to cause said at least one apparatus to configure transmission and reception periods of scheduling information in dependence on the mode of operation, wherein the scheduling information comprises at least one of the following: a scheduling grant and a scheduling request.

13. The method as set forth in claim 12, wherein said method comprises controlling transmission of said information to a first apparatus and a second apparatus, and wherein, when said information comprises information defining a coordinated mode, said method further comprises configuring said node to communicate scheduling information with said first apparatus and said second apparatus in a coordinated manner.

14. The method as set forth in claim 13, wherein said method comprises controlling transmission of said information to a first apparatus and a second apparatus, and wherein said method comprises performing at least one of the following:
  configuring said node to communicate scheduling information with said first apparatus during a time period in which said node is not communicating scheduling information with said second apparatus;
  configuring said node not to communicate scheduling information with said first apparatus during a time period in which said node is communicating scheduling information with said second apparatus; and
  coordinating scheduling information such that said node is configured to transmit scheduling information to said first apparatus during a time period when said node is receiving scheduling information from said second apparatus, and to receive scheduling information from said first apparatus during a time period when said node is transmitting scheduling information to said second apparatus.

15. The method as set forth in claim 14, wherein said time period comprises at least one frame or at least one subframe.

16. The method as set forth in claim 12, wherein said mode of operation defines at least one parameter relating to said scheduling information, wherein said at least one parameter comprises at least one of: transmission time interval; scheduling timing; and hybrid automatic repeat request acknowledgement/non-acknowledgement timing.

17. An apparatus comprising
  at least one processor;
  and at least one memory including computer program code;
  the at least one memory and the computer program code configured to, with the at least one processor, cause the apparatus at least to:
  control a transmission, to at least one further apparatus, of information, said information defining a mode of operation for communicating scheduling information, wherein said mode of operation comprises at least one of a stand-alone mode and a coordinated mode in a system comprising a master access node, at least one slave access node and at least one user equipment;
  wherein said information is configured to cause said at least one further apparatus to configure transmission and reception periods of scheduling information in dependence on the mode of operation, wherein the scheduling information comprises at least one of the following: a scheduling grant and a scheduling request.

18. The apparatus as set forth in claim 17, wherein said apparatus is configured to control transmission of said information to at least one further apparatus comprising a second apparatus and a third apparatus; and
  wherein, when said information comprises information defining a coordinated mode, said apparatus is configured to communicate scheduling information with said second apparatus and said third apparatus in a coordinated manner.

19. The apparatus as set forth in claim 18, wherein said apparatus is configured to control transmission of said information to at least one further apparatus comprising a second apparatus and a third apparatus and wherein said apparatus is configured to perform at least one of the following:
  configured to communicate scheduling information with said second apparatus during a time period in which said apparatus is not communicating scheduling information with said third apparatus;
  configured not to communicate scheduling information with said second apparatus during a time period in which said apparatus is communicating scheduling information with said third apparatus; and
  configured to transmit scheduling information to said second apparatus during a time period when said apparatus is receiving scheduling information from said third apparatus, and to receive scheduling information from said second apparatus during a time period when said apparatus is transmitting scheduling information to said third apparatus.

20. The apparatus as set forth in claim 19, wherein said time period comprises at least one frame or at least one subframe.

21. The apparatus as set forth in claim 17, wherein said mode of operation defines at least one parameter relating to said scheduling information, wherein said at least one parameter comprises at least one of: transmission time interval; scheduling timing; and hybrid automatic repeat request acknowledgement/non-acknowledgement timing.

22. A computer program product, the computer program product comprising a non-transitory computer-readable storage medium and storing executable code that, when executed by at least one data processing apparatus, is configured to cause the at least one data processing apparatus to perform a method comprising:
  receiving, at an apparatus, information from a node, said information defining a mode of operation for communicating scheduling information, wherein said mode of operation comprises at least one of a stand-alone mode and a coordinated mode in a system comprising a master access node, at least one slave access node and at least one user equipment; and
  configuring transmission and reception periods of scheduling information at said apparatus in dependence on the mode of operation, wherein the scheduling information comprises at least one of the following: a scheduling grant and a scheduling request.

23. A computer program product, the computer program product comprising a non-transitory computer-readable storage medium and storing executable code that, when executed by at least one data processing apparatus, is configured to cause the at least one data processing apparatus to perform a method comprising:
  controlling a transmission, to at least one apparatus, of information from a node, said information defining a mode of operation for communicating scheduling information, wherein said mode of operation comprises at least one of a stand-alone mode and a coordinated mode in a system comprising a master access node, at least one slave access node and at least one user equipment;
  wherein said information transmitted from said node is configured to cause said at least one apparatus to configure transmission and reception periods of scheduling information in dependence on the mode of operation, wherein the scheduling information comprises at least one of the following: a scheduling grant and a scheduling request.

* * * * *